Jan. 29, 1963 R. P. BRIDGES 3,076,076
ELECTRICAL PROTECTIVE DEVICES
Filed July 22, 1959 2 Sheets-Sheet 1
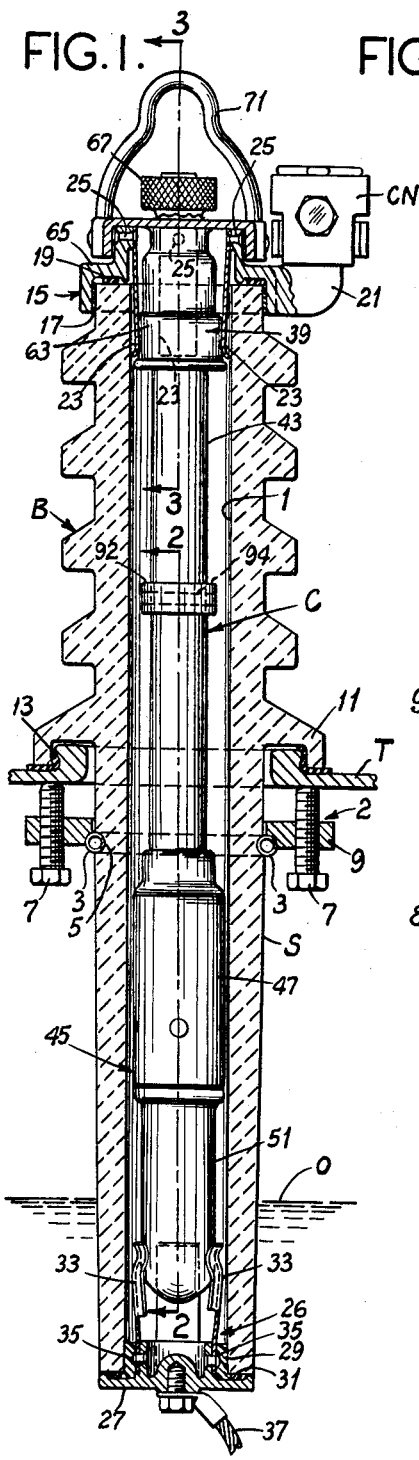
Ronald P. Bridges,
Inventor,
Koenig and Pope,
Attorneys Jan. 29, 1963 R. P. BRIDGES 3,076,076
ELECTRICAL PROTECTIVE DEVICES
Filed July 22, 1959 2 Sheets-Sheet 2
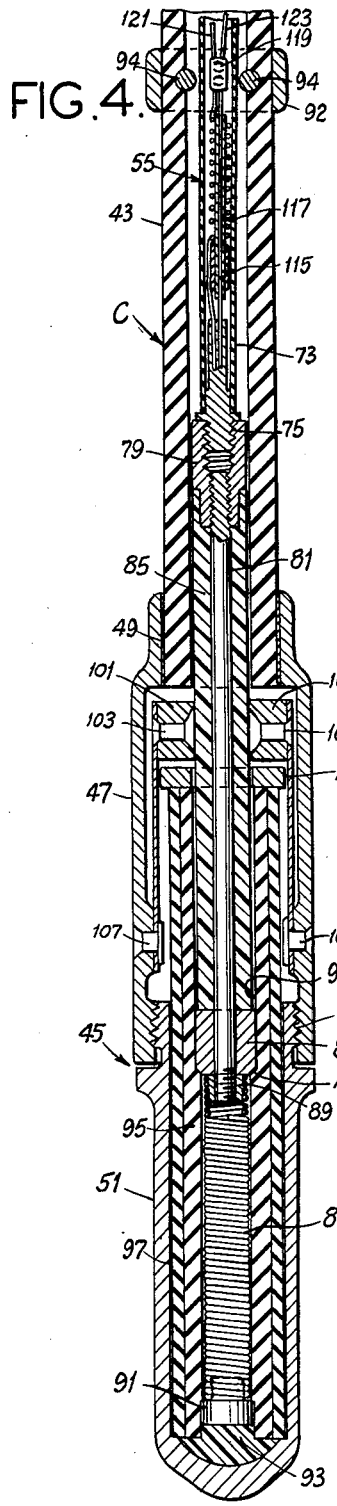
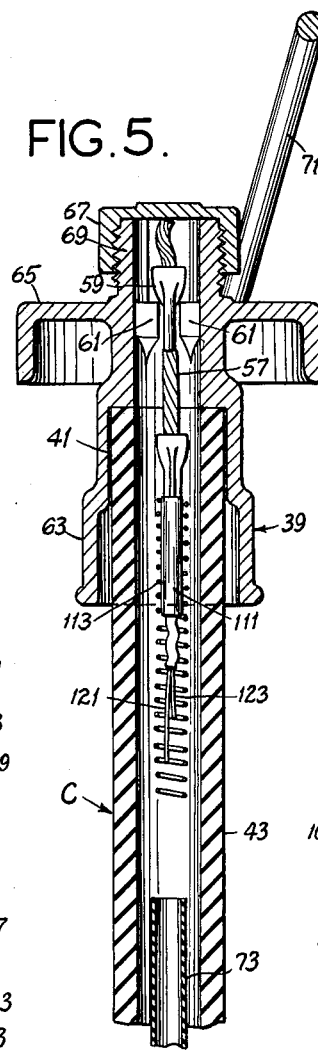
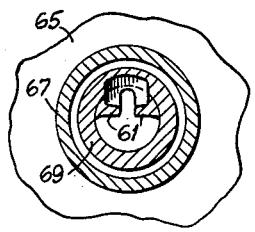
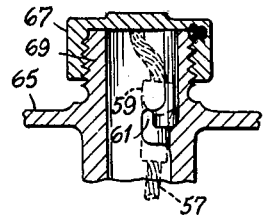
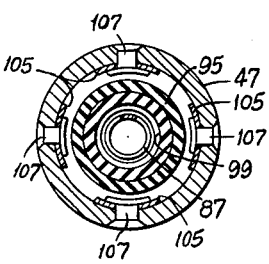
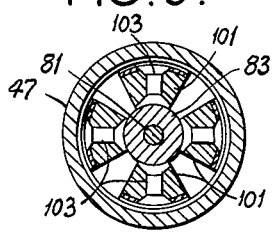
Ronald P. Bridges,
Inventor.
Koenig and Pope,
Attorneys.

:::

United States Patent Office 3,076,076
Patented Jan. 29, 1963

3,076,076
ELECTRICAL PROTECTIVE DEVICES
Ronald P. Bridges, Du Page County, Ill., assignor to
A. B. Chance Company, Centralia, Mo., a corporation of Missouri
Filed July 22, 1959, Ser. No. 828,869
21 Claims. (Cl. 200—114)

This invention relates to electrical protective devices and more particularly to fused cutout cartridges for protecting electrical distribution components and facilities.

Among the several objects of the invention may be noted the provision of a fused cutout cartridge which will function effectively to protect electrical apparatus, such as transformers, from both low and high fault current or short circuit conditions; the provision of such a fused cutout cartridge which has a high interrupting capacity, is rugged but inexpensive in construction, and reliable in operation; the provision of apparatus of the class described in which fuse links may conveniently be replaced; the provision of such a fused cutout cartridge which will quickly and effectively open an electrical circuit in response to both low and high current faults; the provision of such a fused cutout cartridge which may be conveniently mounted in the bore of a transformer high voltage bushing; the provision of such a bushing-fused cutout cartridge structure which will completely protect feeder circuits against damage from an internal fault in the transformer, and protect the transformer against burnout from secondary short circuits or overloading; the provision of such a bushing-fused cutout cartridge which will provide complete protection to a transformer without the need for incorporating circuit breakers in series with the low voltage or secondary winding; and the provision of a bushing-fused cutout cartridge structure in which the fused cutout cartridge or components thereof may be conveniently replaced or changed without breaking the atmospheric seal of the transformer. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is an elevation of a fused cutout cartridge of the present invention in combination with a transformer bushing shown in cross-section;

FIGS. 2 and 3 are longitudinal cross sections taken on lines 2—2 and 3—3, respectively, of FIG. 1, on an enlarged scale;

FIGS. 4 and 5 are longitudinal cross sections similar to those of FIGS. 2 and 3, but showing the fused cutout cartridge in a circuit-open condition after blowing or melting of the fuse link; and, FIGS. 6, 7, 8 and 9 are transverse cross sections taken on lines 6—6, 7—7, 8—8 and 9—9, respectively, of FIGS. 2 and 3.

Corresponding reference characters indicate corresponding parts throughout the several views of the drawings.

A number of different systems have been proposed and used for protecting transformers in an electrical power distribution system from secondary short circuits and overload, and for protecting the feeder circuits and distribution system from failure of the transformer, such as by an internal short circuit fault. One relatively recent arrangement has been the so-called completely self-protected type transformer in which one or both of the leads to the high voltage winding of the transformer is fused (usually by a fuse mounted inside the transformer tank) and the low voltage windings have thermally operated circuit breakers connected in series therewith. For protection against lightning, arresters are usually mounted on the transformer tank so that discharge gaps to ground are provided from the line connectors at the outer end of each high voltage bushing. Such self-protected transformers have a number of disadvantages. For example, because of the number and complexity of the breakers, and associated protective equipment, there is an increased likelihood of failure, mechanical or electrical, at one point or another of the protective components. Also, the time-current characteristic curves of the breakers do not approach the safe loading curves of the transformers as closely as might be desired.

In accordance with the present invention, a fused cutout cartridge is provided which is an inexpensive, rugged, reliable and effective protective device, and in a novel combination with a high voltage transformer bushing can provide the same or better protection of the feeder circuits and transformer as does the self-protected transformer with breakers. My fused cutout cartridge will effectively operate to quickly interrupt and open the circuit in which it is connected in response to both high and low fault currents. In essence, the fused cutout cartridge of this invention comprises an elongate fuse tube of insulating material with a stationary metallic contact at one end and with a fuse link axially mounted within the bore of the tube. One terminal of the fuse link, usually a pigtail lead or length of stranded conductive wire is secured to this contact at the end of the fuse tube, while the other fuse link terminal, usually a metallic button threaded or otherwise secured to a stud, is rigidly mechanically coupled and electrically connected to a movable contact. The other end of the fuse tube carries another stationary contact means, preferably a metallic housing with contact members connected thereto, engaged by the movable contact. A spring or other equivalent means biases the movable contact out of engagement with the secondary stationary contact means so that upon the fuse link's blowing or melting, the electrical circuit between the two stationary contact means is broken at two points, each constituting an arc-interrupting gap, which are electrically in series. This cartridge may be associated with the transformer, or any other devices to be protected, merely by providing spaced electrical terminals into or across which the stationary contact means may be engaged to complete the electrical circuit to the transformer. Although these terminals could be mounted on a pole or cross arm, it is preferred that the cartridge be accommodated in the bore of a high voltage transformer bushing and that resilient terminal members be provided at opposite ends of the bushing bore for this purpose.

Referring now more particularly to the drawing, a fused cutout cartridge of the present invention, generally indicated at reference character C, is shown mounted axially within the bore 1 of a conventional transformer high voltage or primary bushing B of insulating material such as porcelain or ceramic construction. Bushing B is attached to a transformer tank cover T by an internal clamping device 2 which engages the shank S of the bushing. More specifically, a circular coiled spring 3 is fitted into a groove 5 of shank S and this provides a resilient ridge against which a clamping ring 9 may bear. By drawing up bolts 7 into clamping ring 9, flange 11 of bushing B is snugly sealed, by means of a ring gasket 13, to the tank cover. The upper or outer end of bushing B has a flanged metallic casting 15 secured thereto by means of a strong adhesive material, such as cured epoxy resin 17. A resilient O-ring 19 is positioned between the casting 15 and the outer end of bushing B to provide a permanent seal between these two components. Casting 15 includes a bent arm 21 projecting radially therefrom to which is bolted a conventional clamp type connector CN adapted to electrically connect and mechanically secure a line conductor thereto. A set of resilient metallic fingers 23 are riveted at 25 around the inner periphery of casting 15 so as to project inwardly or downwardly into bore 1 and constitute an upper clip assembly or terminal. The other or lower end of bore 1 of bushing B is fitted with a lower terminal assembly 26, which includes a flanged metal plug 27 sealed and adhered to the end of bushing B by epoxy resin 29 and a resilient O-ring type gasket 31. Assembly 26 includes a set of metallic resilient cantilever arms 33 generally similar to the fingers 23 of the top terminal assembly. Arms 33 are riveted, as indicated at 35, at their lower extremities to plug 27 so as to project upwardly around the inner periphery of the inner end of bushing bore and constitute a lower terminal or slip assembly. This terminal is electrically connected, by means of a conductor 37 bolted to plug 27, to one side of the high voltage or primary winding of the transformer. If two cover-mounted bushings are used, it will be understood that two bushing structures similar to that just described, each with a separate fuse cutout cartridge C, may be used. It will be noted that the inner end of shank S of bushing B may be below the level of the liquid insulating medium such as oil O, in the transformer tank.

Fused cutout cartridge C includes a metallic ferrule 39 secured, as indicated at 41, by means of a strong adhesive, such as a cured epoxy resin, to the one end of an elongate fuse tube 43. This fuse tube is made from insulating material such as resin-impregnated rolled fiberglass tubing, preferably with bone grade fiber lining, which improves the arc-extinguishing characteristics thereof. A metallic housing 45 is carried at the other end of fuse tube 43. Housing 45, which broadly constitutes a stationary contact means adapted to engage lower terminal assembly 26, includes a socket portion 47, the upper end of which is secured as indicated at 49 by an epoxy resin material to tube 43, and an elongated cup section 51. The lower end of socket 47 is internally threaded so as to mate with an externally threaded upper neck 53 of cup 51. Thus the socket and cup sections of housing 45 are separable and can be opened for replacement or inspection of various internal components of the housing and cartridge.

A fuse link 55 is mounted within tube 43. This fuse link is preferably of the slow-fast type. One terminal of fuse link 55 comprises a flexible lead 57 of stranded wire with a metallic button 59 crimped thereto and adapted to engage abutments 61 (see FIGS. 6 and 7) and thereby be mechanically and electrically interconnected to ferrule 39. This ferrule constitutes an upper stationary contact means and includes a lower hip portion 63 adapted to be engaged by resilient contacting terminal fingers 23 or any other independent terminal means, such as indicated in FIG. 3. The upper portion of ferrule 39 also includes a skirted shoulder 65 adapted to fit over the upper end of bushing B. A metal cap 67, which may be of the so-called expendible type (i.e., central portion ruptures or blows out to provide venting of fuse tube during high current faults), is screw-threaded to an upstanding neck 69. For convenience in handling and installation, ferrule 39 is provided with a pivoted bail or lift ring 71 for use with a hot stick or manually.

The fusible element or elements of fuse link 55, as well as certain other components (which will be discussed in more detail below), are enclosed in an insulating tube 73, which is substantially aligned along a central longitudinal axis of fuse tube 43. The other end of fuse link 55 comprises a threaded terminal stud or connector 75 which is detachably connected to an internally threaded metallic coupling 79. The diameter of coupling 79 is only slightly less than the inner diameter of fuse tube 43 and is adapted to slide axially therein. Extending axially from the threaded recess in the opposite end of coupling 79 is a metal rod 81, the other end of which is also threaded. A movable switch contact, comprising a cylindrical metallic member 83 bored to receive rod 81, is thus mounted for sliding movement coaxial with the longitudinal axis of fuse tube 43. Rod 81 is covered by a follower sleeve 85 of insulating material such as a cured acrylic resin. Contact 83 and its associated rod 81, follower 85, fuse coupling 79 and the fuse link stud 75 are all biased downwardly (as shown in FIG. 2) toward the end of housing cup 51 by means of a tension spring 87. One end of this spring is threadably engaged to the externally threaded surface of a spring coupling 89 while the other end of this spring is threadably engaged around the threaded neck of an anchor 91, the lower portion of which is embedded in cured epoxy resin material 93. This resin not only functions to firmly adhere anchor 91 to the inner end of housing cup 51, but also to insulate it therefrom. It will be noted that spring coupling 89 is internally threaded so as to receive and be secured to the end of rod 81.

Movement of contact 83 against the bias and upwardly along the bore of tube 43 is prevented by a stop ring or collar 92 and two transverse drive pins 94 which constitute a restriction in the bore of tube 43 intermediate its ends. Thus, movement of coupling 79 and its associated contact 83 in an upward direction is limited.

Cup portion 51 of housing 45 is provided with an internal insulating tubular liner or contact tube 95 with its outer surface adhered by epoxy resin 97 to the inner surface of cup 51. Tube 95, which is preferably formed of resin-impregnated rolled fiberglass tubing (preferably with a bone grade fiber inner lining), is counterbored as indicated at 99 to a diameter just slightly greater than the outside dimension of movable contact 83, which is adapted to move axially from a circuit-closed position (FIG. 2) to a circuit-open position (FIG. 4) within counterbore 99 of contact tube 95. Shoulder 100, formed by the counterbore 99 within contact tube 95, functions to limit the movement of contact 83 in a downward direction (FIG. 4).

A set of fixed resilient contact members 101 of sector shape is respectively mounted by means of rivets 103 at the upper ends of metallic cantilever spring arms 105, the lower ends of which are riveted at 107 around the inner periphery of socket 47. These contact members 101 constitute the other or fixed contact of the switch unit mounted in housing 45 and are symmetrically arrayed around the longitudinal axis thereof so as to grip or engage the surface of movable contact member 83 (see FIG. 9). A flat ring-shaped electrode 109 of an arc-resistant metallic material (e.g., a tungsten alloy) is interposed between the upper end of liner 95 and the lower edge of contact members 101. The inner diameter of electrode 109 is slightly greater than the outer dimensions of contact 83. This electrode is maintained coaxial with the longitudinal axis of the fuse tube-fuse link-housing assembly by means of the centering action of spring arms 105 which bear against the outer periphery of electrode 109.

The fuse cartridge of the present invention, therefore, includes a fuse link 55 and a plunger type switch (movable contact 83 and fixed resilient contact members 101) series-connected between two stationary contact means (ferrule 39 and housing 45) secured at opposite ends of an elongate fuse tube 43 of insulating material. More particularly, fuse link 55, which is a dual element link, includes a sleeve 111 crimped to the inner end of terminal lead 57 and with shoulders that are engaged by a spring 113 compressed between these shoulders and the upper end of the link tube 73. The inner end of flexible fuse link lead 57 and its other terminal, stud connector 75, are electrically interconnected inside insulating tube 73 by a slow fuse link section (comprising an insulated strain pin 115, a heat absorber and heater coil unit 117) joined at a solder junction 119 to a fast section (including fuse wire 121 and strain wire 123). These two fuse link sections are maintained under tension within tube 73 by the action of spring 113.

Operation is as follows:

The fused cutout cartridge C is connected in an electric circuit to be protected by engaging its stationary contacts 39 and 45 with two electrical terminals, such as upper and lower terminal clips 23 and 26 at the outer and inner ends of the bore of bushing B. Assuming the lead 37 is connected to the primary or high voltage winding of a core-coil unit in sealed transformer tank T, and a line conductor of a conventional power distribution system feeder is connected at CN, current will be conducted through cartridge C. Movable contact 83 is held in its normal circuit-closed position (FIG. 2) and in engagement with contact members 101 against the bias of tension spring 87 by the restraining linkage through fuse link 55 and its terminal button 59 to abutments 61.

In the event of a fault which causes current to be drawn through cartridge C exceeding that which fuse link 55 can properly carry, one or both of the current-responsive fuse elements will melt or rupture. The failure of the fuse link releases terminal stud 79, rod 81 and contact 83 so that the latter is propelled by spring 87 immediately to its circuit-open position (FIG. 4). The electrical circuit normally completed through cartridge C will, upon fusing or rupture of the fuse link 55, be broken by two series arc-interrupting gaps. The first of these gaps is across the fused ends of the fuse link elements as they melt and separate. The second of these gaps is that formed between elements of the plunger switch mechanism within housing 45. As contact 83 plunges downwardly in the counterbored insulating liner 95, an arc will be formed between the trailing (or upper as viewed in FIGS. 2 and 4) end of contact 83 and the arc-resistant electrode 109 (thus protecting contact members 101 from burning and pitting). This arc, confined in the arc-extinguishing liner 95, further assures prompt and effective interruption of the electrical circuit which cartridge C protects. If the fault is of high magnitude, such as would be caused by a short in the primary or high voltage winding of a transformer, it is likely that the forces engendered and gas pressures formed within the cartridge by such a fault would be great enough to break the frangible central section of expendible cap 67. This venting through the upper end of fuse tube 43, plus the breaking of the circuit by the two series arc-interrupting gaps, assures quick and reliable circuit opening in the event of high current faults.

If the fault is a low current fault, such as that caused by an overload or short circuit on the secondary or low voltage winding of a transformer, there is usually not enough gas pressure generated to rupture the expendible cap 67 (thus preserving the integrity of the transformer seal). On lower current faults, there is a decided tendency for the arc across the ruptured fuse link end to sustain itself, inasmuch as very little gas pressure is generated by these lower current faults. It is highly important that the arc not be sustained, and the action of the series switch within housing 45 introducing a second arc-interrupting gap prevents this.

The arc within the counterbored portion 99 of liner 95 as contact 83 moves downwardly can generate considerable gas pressures, depending, of course, on the magnitude of the current interrupted. This would tend to propel contact 83, its insulated sleeve follower 85 and rod 81 upwardly and out the top of fuse tube 43. However, the restriction in the central part of fuse tube 43 by pins 94 effectively prevents such action.

After operation of the cartridge in response to a fault, the circuit may be restored to service engaging the ring or bail 71 with a hot stick and lifting out cartridge C, unscrewing cup 51 from socket 47 and cap 67 from ferrule 39, and replacing the ruptured fuse link with a new one. When replacing link 55 the threaded stud 75 is firmly engaged with coupling 79 and the flexible lead 57 (originally much longer than shown) is pulled upwardly through the open neck of ferrule 39 until button 59 is just past abutments 61. By seating button 59 in these hook-shaped seats or abutments, movable contact 83 is positioned in engagement with fixed contact members 101 and the plunger switch is maintained in circuit closed condition until link 55 is again ruptured. Any excess length of lead 57 is cut off before cap 67 is replaced.

It will be understood that fused cutout cartridges of the present invention may be mounted in engagement with or across any set of terminal members in an electrical circuit and need not be combined in the bore of a transformer bushing. Also, it is to be noted that, although a spring-type dual-element fuse link is shown and has certain advantages, other types of fuse links may be used in these cutout cartridges.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A fused cutout cartridge comprising an elongate fuse tube of insulating material, stationary contact means at one end thereof, a fuse link axially mounted within said tube and having a lead at one end secured to said contact means and a connector at the other end, a rod adapted to be detachably secured to said connector and extend away from the other end of said fuse link along a longitudinal axis thereof, a movable contact affixed to said rod, a metallic socket on the other end of said fuse tube, an elongate metallic cup adapted to be detachably secured to said socket and having a longitudinal axis aligned with that of said fuse tube and fuse link, a plurality of fixed resilient contact members electrically connected to said metallic cup and engaged by said movable contact, and means biasing said movable contact out of circuit-making engagement with said fixed resilient contact members to provide an expanding arc gap between said members and said movable contact whereby upon blowing of said fuse link the electrical circuit between said stationary contact means and said fixed resilient contact members is broken by two series arc-interrupting gaps both of which lengthen in proportion to the movement of the movable contact away from said contact members.

2. A fused cartridge cutout as set forth in claim 1 in which said metallic socket and said metallic cup have mating screw-threaded ends and said resilient contact members are secured to the inner surfaces of said socket.

3. A fused cutout cartridge as set forth in claim 1 in which said contact members are sector shaped and symmetrically arrayed around the inner periphery of said housing.

4. A fuse cutout cartridge as set forth in claim 3 in which said biasing means is a tension spring connected between the movable contact and one end of the housing but electrically insulated therefrom.

5. A fuse cutout cartridge as set forth in claim 4 which further includes an insulating sleeve for said rod whereby said rod is insulated from said resilient contact members when said movable contact is not in circuit-making engagement therewith.

6. A fuse cutout cartridge as set forth in claim 5 which further includes a metallic ring-shaped electrode in said housing and coaxial with a longitudinal axis thereof, said electrode electrically connected to said contact members and positioned adjacent thereto, whereby upon movement of said movable contact out of circuit-making engagement with the contact members any arc formed is between said ring and said movable contact.

7. A fuse cutout cartridge as set forth in claim 6 in which the housing further includes an internal liner of insulating material forming a bore for axial movement of said movable contact between its circuit-closed position and its circuit-open position.

8. A fuse cutout cartridge as set forth in claim 7 in which the metallic housing comprises a metallic socket secured at its one end to said other end of said fuse tube, and an elongate metallic cup threadably engaged to the other end of said socket, whereby the housing may be opened for replacement of said fuse link.

9. In combination, a fused cutout cartridge as set forth in claim 8 and a transformer bushing of insulating material having a longitudinal bore of a diameter larger than that of said cartridge, said bore being sealed at its inner extremity and open at its outer end to slidably receive said cartridge, first resilient electric terminal means in said bore at said open end thereof adapted to be electrically connected to a line conductor, and second resilient electrical terminal means in said bore adjacent said sealed end thereof adapted to be electrically connected to a high voltage winding of a transformer, the first and second stationary contact means being engageable with said first and second terminal means, whereby said fused cutout cartridge is serially connected in an electric circuit between said transformer winding and said line conductor and constitutes a protective device integral with said transformer and bushing.

10. The combination of a fused cutout cartridge and transformer bushing at set forth in claim 9 in which said first stationary contact means comprises a ferrule having a flanged fitting adapted to cover and encompass the open end of said bushing.

11. A fused cutout cartridge comprising an elongate fuse tube of insulating material, stationary contact means at one end thereof, a fuse link axially mounted within said tube and having a lead at one end secured to said contact means, said fuse link being electrically connected and mechanically coupled at its other end to a movable contact, second stationary contact means adjacent to the other end of said fuse tube engaged by said movable contact, said second stationary contact means comprising an elongate metallic housing in which are mounted fixed electrical contact members, said movable contact being axially slidable within said housing from a circuit-closed position to a circuit-open position, and means biasing said movable contact out of circuit-making engagement with said second stationary contact means to provide an expanding arc gap between said movable contact and said second stationary contact, whereby upon blowing of said fuse link the electrical circuit between said first and second stationary contact means is broken by two series arc-interrupting gaps, both of which lengthen in proportion to the movement of the movable contact away from said second stationary contact means, said metallic housing comprising a socket affixed to said other end of said fuse tube, and an elongate cup detachably secured to said socket, whereby the housing may be opened for replacement of said fuse link.

12. A fused cutout cartridge comprising an elongate fuse tube of insulating material, first stationary contact means at one end therof, second stationary contact means at the other end of the fuse tube comprising an elongate metallic housing having its longitudinal axis generally aligned with the longitudinal axis of said fuse tube, a plunger type switch enclosed in said housing and having a cylindrical movable contact the axis of which is aligned with said longitudinal axis, said switch further including fixed resilient contact members adapted to peripherally grip said movable contact in a circuit-closed position, means biasing said switch to a circuit-open position to provide an expanded arc gap between the contacts of said switch, and a fuse link axially mounted within said tube and series-connected with said switch between said first and second stationary contact means, said link adapted when intact to maintain said switch in a circuit-closed position against the action of said biasing means, whereby upon rupture of said fuse link the electrical circuit between said two stationary contact means is broken by two series arc-interrupting gaps both of which expand in proportion to the movement of the contacts of the switch away from each other, said biasing means being a tension spring interconnected between said movable contact and said metallic housing, said metallic housing comprising a metallic socket secured at its one end to said other end of said fuse tube, and an elongate metallic cup detachably affixed to the other end of said socket, whereby the housing may be opened for replacement of said fuse link.

13. A fused cutout cartridge comprising an elongate fuse tube of insulating material, stationary contact means at one end thereof, a fuse link axially mounted within said tube and having a lead at one end secured to said contact means and a connector at the other end, a rod secured to said connector, a movable contact affixed to said rod, a second stationary contact means at the other end of said fuse tube, means electrically connected to said second stationary contact for engaging said movable contact, means biasing said movable contact out of engagement with said contact engaging means to provide an expanding arc gap between said last named means and said movable contact, said rod being positioned within an insulating sleeve whereby said rod is insulated from said contact engaging means when said movable contact is not in circuit-making engagement therewith.

14. A fused cutout cartridge as set forth in claim 13 wherein said movable contact is cylindrical and wherein said contact engaging means includes fixed resilient contact members adapted to peripherally grip said movable contact.

15. A fused cutout cartridge as set forth in claim 14 in which said biasing means is a tension spring interconnected between said movable contact and said second stationary contact.

16. A fused cutout cartridge as set forth in claim 15 which further includes means associated with said fuse tube for limiting movement of said movable contact along said fuse tube in a direction toward said second stationary contact.

17. A fused cutout cartridge as set forth in claim 13 in which said second stationary contact comprises an elongate metallic housing having its longitudinal axis generally aligned with the longitudinal axis of said fuse tube, said housing including an internal liner of insulating material forming a bore for axial movement of said movable contact.

18. A circuit interrupter comprising a first and a second stationary contact; a movable contact normally engaging said first stationary contact and provided with a conductor extending in one direction therefrom; a fuse link connecting said conductor remote from the movable contact with said second stationary contact; yieldable means coupled with said movable contact and normally biasing the latter in the opposite direction whereby, upon melting of said fuse link, the movable contact is pulled away from the first stationary contact and the conductor is pulled therewith, creating a first expanding arc gap between the separated ends of the fuse link; and means creating a second arc gap upon said melting of the fuse link including an insulator coupled with the movable contact for movement therewith upon melting of the fuse link to a position interposed between the conductor and the first stationary contact.

19. The invention of claim 18 wherein said insulator extends in said one direction from the movable contact in surrounding relationship to the conductor.

20. The invention of claim 19 wherein said first stationary contact normally surrounds the movable contact and wherein the insulator is surrounded by the first stationary contact after said melting of the fuse link.

21. The invention of claim 20 wherein the insulator extends in said one direction from the first stationary contact toward that end of the conductor remote from the movable contact when the fuse link is melted in surrounding relationship to the conductor whereby to prevent arc formation between the first stationary contact and said last-mentioned end of the conductor.

References Cited in the file of this patent

UNITED STATES PATENTS

| | | |
|---|---|---|
| 1,294,621 | Conrad | Feb. 18, 1919 |
| 2,183,751 | McMahon et al. | Dec. 9, 1939 |
| 2,256,360 | Steinmayer et al. | Sept. 16, 1941 |
| 2,259,946 | Wallace | Oct. 21, 1941 |
| 2,355,824 | Schultz | Aug. 15, 1944 |
| 2,403,121 | Rawlins et al. | July 2, 1946 |
| 2,567,236 | Rawlins et al. | Sept. 11, 1951 |
| 2,651,695 | Baker | Sept. 8, 1953 |
| 2,662,947 | Kyle | Dec. 15, 1953 |
| 2,816,978 | Lindell | Dec. 17, 1957 |